United States Patent
Florey et al.

(10) Patent No.: US 9,587,522 B2
(45) Date of Patent: Mar. 7, 2017

(54) MODEL-BASED PARTIAL LETDOWN THRUST BALANCING

(71) Applicant: General Electric Company, Schenectady, NY (US)

(72) Inventors: Thomas Andrew Florey, Schenectady, NY (US); Kurt Neal Laurer, Saratoga Springs, NY (US); David Stasenko, Wilkinsburg, PA (US)

(73) Assignee: General Electric Company, Schenectady, NY (US)

( * ) Notice: Subject to any disclaimer, the term of this patent is extended or adjusted under 35 U.S.C. 154(b) by 450 days.

(21) Appl. No.: 14/174,154

(22) Filed: Feb. 6, 2014

(65) Prior Publication Data

US 2015/0218974 A1    Aug. 6, 2015

(51) Int. Cl.

| F01D 9/04 | (2006.01) |
|---|---|
| F01D 25/24 | (2006.01) |
| F01D 17/10 | (2006.01) |
| F01K 23/10 | (2006.01) |
| F01K 7/16 | (2006.01) |
| F01D 3/02 | (2006.01) |
| F02C 6/18 | (2006.01) |

(52) U.S. Cl.
CPC .............. *F01K 23/101* (2013.01); *F01D 3/02* (2013.01); *F01K 7/165* (2013.01); *F01K 23/10* (2013.01); *F02C 6/18* (2013.01); *F05D 2220/31* (2013.01); *Y02E 20/14* (2013.01); *Y02E 20/16* (2013.01); *Y02E 20/36* (2013.01)

(58) Field of Classification Search
CPC ... F01K 23/10; F01K 7/16; F01K 7/02; F01K 7/025; F01K 7/04; F01K 7/22; F01K 7/223; F01K 7/226; F01K 7/24; F01K 7/26; F01K 7/28; F01K 23/06; F01D 17/10; Y02E 20/16; Y02E 20/36; F02C 6/18
USPC ...... 60/642, 653, 654, 655, 677–680, 39.182
See application file for complete search history.

(56) References Cited

U.S. PATENT DOCUMENTS

| 3,955,358 | A | * | 5/1976 | Martz | F01K 13/02 |
|---|---|---|---|---|---|
| | | | | | 122/451 S |
| 5,167,484 | A | * | 12/1992 | Ponziani | F01D 3/04 |
| | | | | | 415/1 |
| 5,411,365 | A | * | 5/1995 | Mazzola | F01D 25/24 |
| | | | | | 415/108 |
| 6,230,480 | B1 | * | 5/2001 | Rollins, III | F01K 23/105 |
| | | | | | 122/7 B |
| 8,197,182 | B2 | * | 6/2012 | Hernandez | F01D 3/02 |
| | | | | | 415/93 |
| 2010/0158666 | A1 | * | 6/2010 | Hernandez | F01D 3/02 |
| | | | | | 415/93 |

(Continued)

*Primary Examiner* — Brian D Nash
(74) *Attorney, Agent, or Firm* — Ernest G. Cusick; Hoffman Warnick LLC

(57) ABSTRACT

A method, control system, and combined cycle power plant are disclosed herein, which enable balancing thrust between a high pressure (HP) section and an intermediate pressure (IP) section of an opposed flow steam turbine in a combined cycle power plant, including predicting or determining a presence or absence of a thrust imbalance between the HP section and the IP section based on steam flow, pressure, and temperature data at an HP section inlet; and based on the presence or absence of the thrust imbalance, adjusting an amount of steam that enters the HP section.

15 Claims, 3 Drawing Sheets

(56) References Cited

U.S. PATENT DOCUMENTS

| | | | |
|---|---|---|---|
| 2010/0178156 A1* | 7/2010 | Rivas Cortes | F01K 17/02 415/13 |
| 2011/0110759 A1* | 5/2011 | Sanchez | F02C 6/04 415/1 |
| 2012/0151918 A1 | 6/2012 | Sathyanarayana et al. | |
| 2012/0151921 A1 | 6/2012 | Sathyanarayana et al. | |
| 2012/0151925 A1 | 6/2012 | Kluge et al. | |
| 2012/0156004 A1 | 6/2012 | Sathyanarayana et al. | |

\* cited by examiner

MODEL-BASED PARTIAL LETDOWN THRUST BALANCING

BACKGROUND OF THE INVENTION

The invention relates generally to turbomachines, and more particularly to turbomachines such as steam turbines used in combined cycle power plants having district heating/combined heat-power (DH/CHP) applications.

Combined cycle power plants employ two or more thermodynamic cycles working in tandem to extract useful energy from heat. For example, a gas turbine and a steam turbine may be used in tandem. The gas turbine may burn a fuel, e.g., natural gas or synthesis gas, and exhaust hot gas, which is used to generate steam to power a steam turbine. Similar arrangements may also be used for other applications such as, e.g., marine propulsion and other heat and power applications.

Gas turbines typically operate with a range described herein as the Normal Load Range ("NLR"). The NLR includes the range over which a gas turbine operates during normal operation of a combined cycle power plant. Commonly, NLR is associated with operation in compliance with emissions permitting and grid-code. Certain operations, for example operation associated with plant start-up or shut-down or casualty situations, may be outside the NLR.

Steam turbines typically include sections that operate at predetermined pressure ranges. The steam turbine may include, e.g., a high pressure (HP) section, an intermediate pressure (IP) section, and may further include a low pressure (LP) section. The rotating blades disposed within each of these sections may be mounted on an axial shaft, and collectively make up the rotor. Control valves and intercept valves may control steam flow through the HP and the IP sections, respectively. In an opposed flow steam turbine, the HP section and the IP section may, for example, be disposed such that steam flows in opposite directions as it moves through the stages of each section. Rotor thrust is typically balanced between the opposed sections.

During operation within the NLR of the gas turbine, the combined cycle may export steam to district heating or other heat applications. The NLR may be defined by endpoints of a Maximum Normal Load ("Max-NL") and a Minimum Normal Load ("Min-NL"). In particular, low pressure steam may be extracted from the steam turbine cycle after it has passed through the IP section, prior to entering the LP section, for use in the particular heat application. In some instances, however, the low pressure steam may be insufficient to meet the heat application's needs. In that instance, intermediate pressure steam may be extracted from the steam turbine prior to its entering the IP section to augment the steam volume provided to the heat application. In opposed flow steam turbines, this extraction of intermediate pressure steam may reduce the thrust in the IP section, and may therefore contribute to a thrust imbalance between the HP and IP sections.

BRIEF DESCRIPTION OF THE INVENTION

A first aspect of the disclosure provides a combined cycle power plant comprising: an opposed flow steam turbine having a high pressure (HP) section and an intermediate pressure (IP) section, and a rotor axially disposed between the HP section and the IP section; a heat recovery steam generator (HRSG); a high pressure (HP) steam line for conducting steam from the HRSG to an inlet on the HP section; an intermediate pressure (IP) steam line for conducting steam from the HRSG to an inlet of the IP section; a high pressure (HP) exhaust line for returning exhaust from the HP section to the HRSG; a district heating (DH) system line for providing steam from the HRSG to a DH system; a valved letdown line for variably providing a fraction of steam from the IP steam line to the district heating (DH) system line; and a valved cascaded bypass line for variably providing a fraction of steam to the HP exhaust line from the HP steam line, bypassing the HP section, in response to an event in which the fraction of steam provided from the IP steam line to the DH system line causes a thrust imbalance on the rotor between the HP section and the IP section.

A second aspect of the disclosure provides a control system for balancing thrust in an opposed flow steam turbine having a high pressure (HP) section and an intermediate pressure (IP) section, the control system comprising: a computing device including a processor and a memory, the memory including instructions which when executed by the processor, cause the computing device to predict or determine a presence or absence of a thrust imbalance between the HP section and the IP section based on at least one of steam flow, pressure, or temperature data measured at an HP section inlet. In a case in which a thrust imbalance is predicted or determined to be present, the computing device is further caused to adjust a fraction of steam that enters the HP section inlet.

A third aspect of the disclosure provides a method for balancing thrust between a high pressure (HP) section and an intermediate pressure (IP) section of an opposed flow steam turbine, the method comprising: predicting or determining a presence or absence of a thrust imbalance between the HP section and the IP section based on steam flow, pressure, and temperature data at an HP section inlet; and based on the presence or absence of the thrust imbalance, adjusting an amount of steam that enters the HP section.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

At least one embodiment of the present invention is described below in reference to its application in connection with the operation of a combined cycle power plant. Although embodiments of the invention are illustrated relative to a power plant including a gas turbine and a steam turbine, it is understood that the teachings are equally applicable to other types of power plants that include a steam turbine and a heat application such as district heating, including cogeneration systems including reheat steam cycles powered by utility boilers, solar collector boilers, geothermal power, and other sources. It should be apparent to those skilled in the art that the present invention is likewise applicable to any suitable power plant. Further, it should be apparent to those skilled in the art that the present invention is likewise applicable to various scales of the nominal size and/or nominal dimensions.

Figure 1:
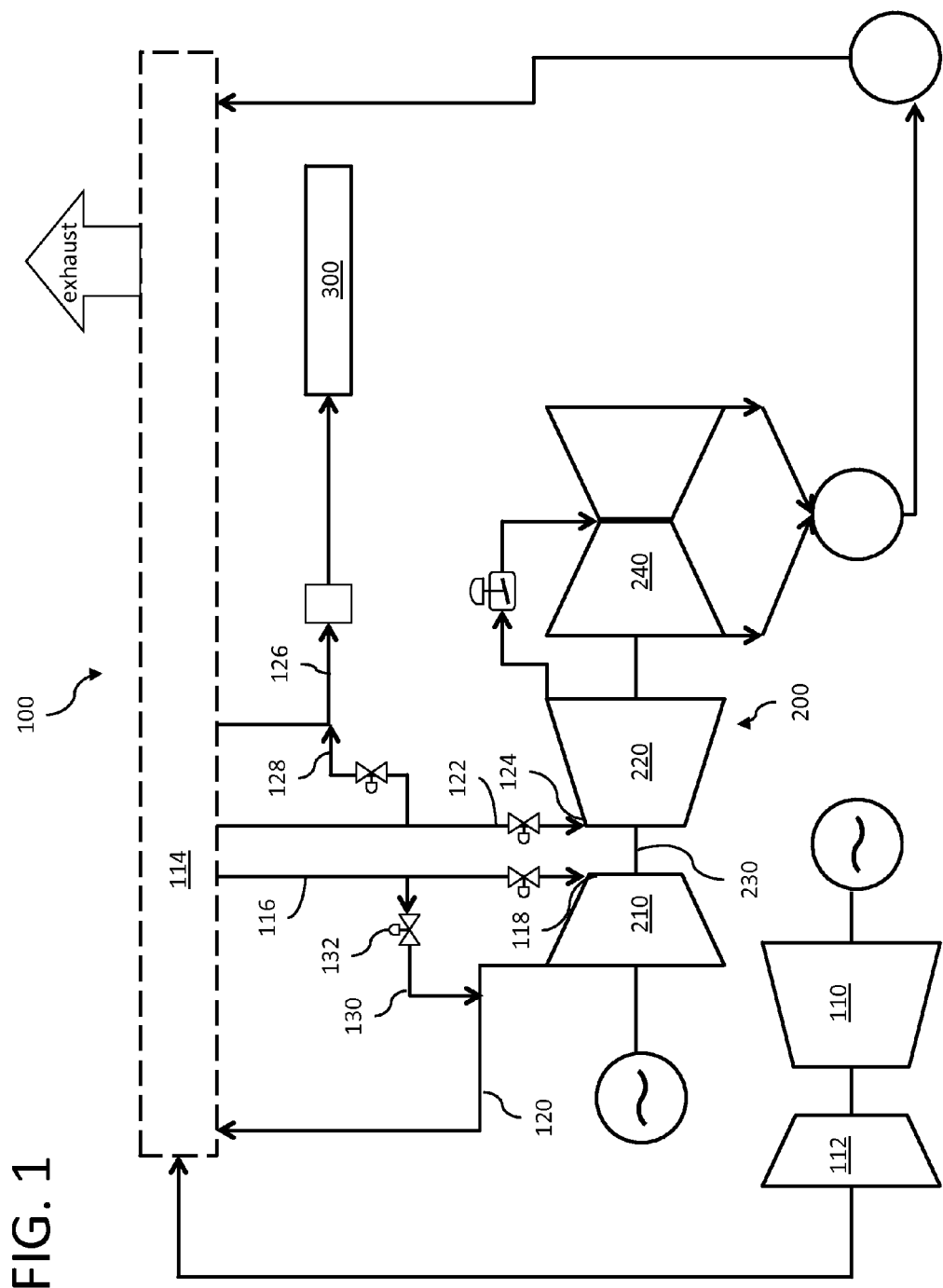
FIG. 1 shows a schematic drawing of a combined cycle power plant according to an embodiment of the invention.
Figure 2:
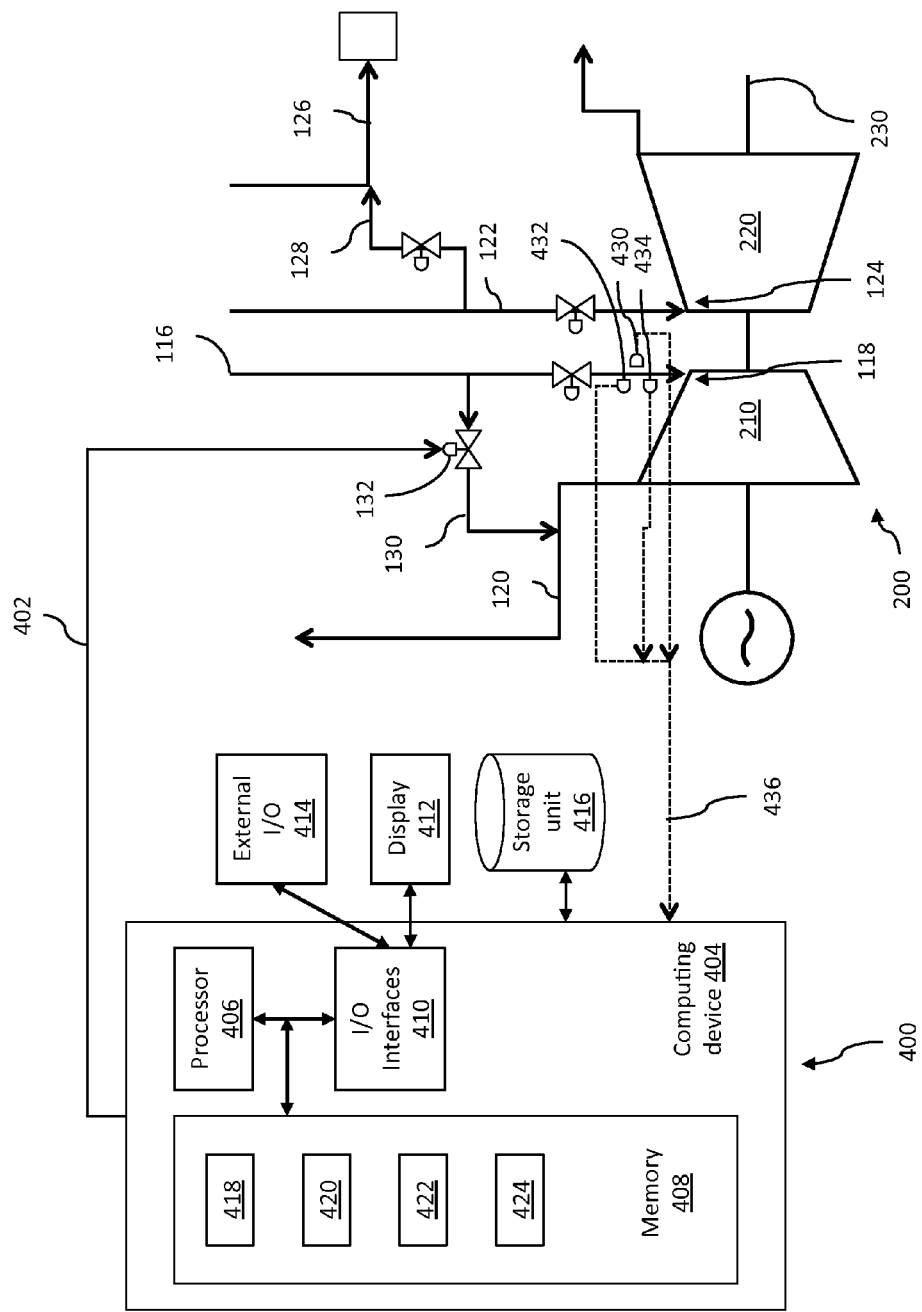
FIG. 2 shows a schematic drawing of a portion of the combined cycle power plant of FIG. 1 and a control system according to an embodiment of the invention.
Figure 3:
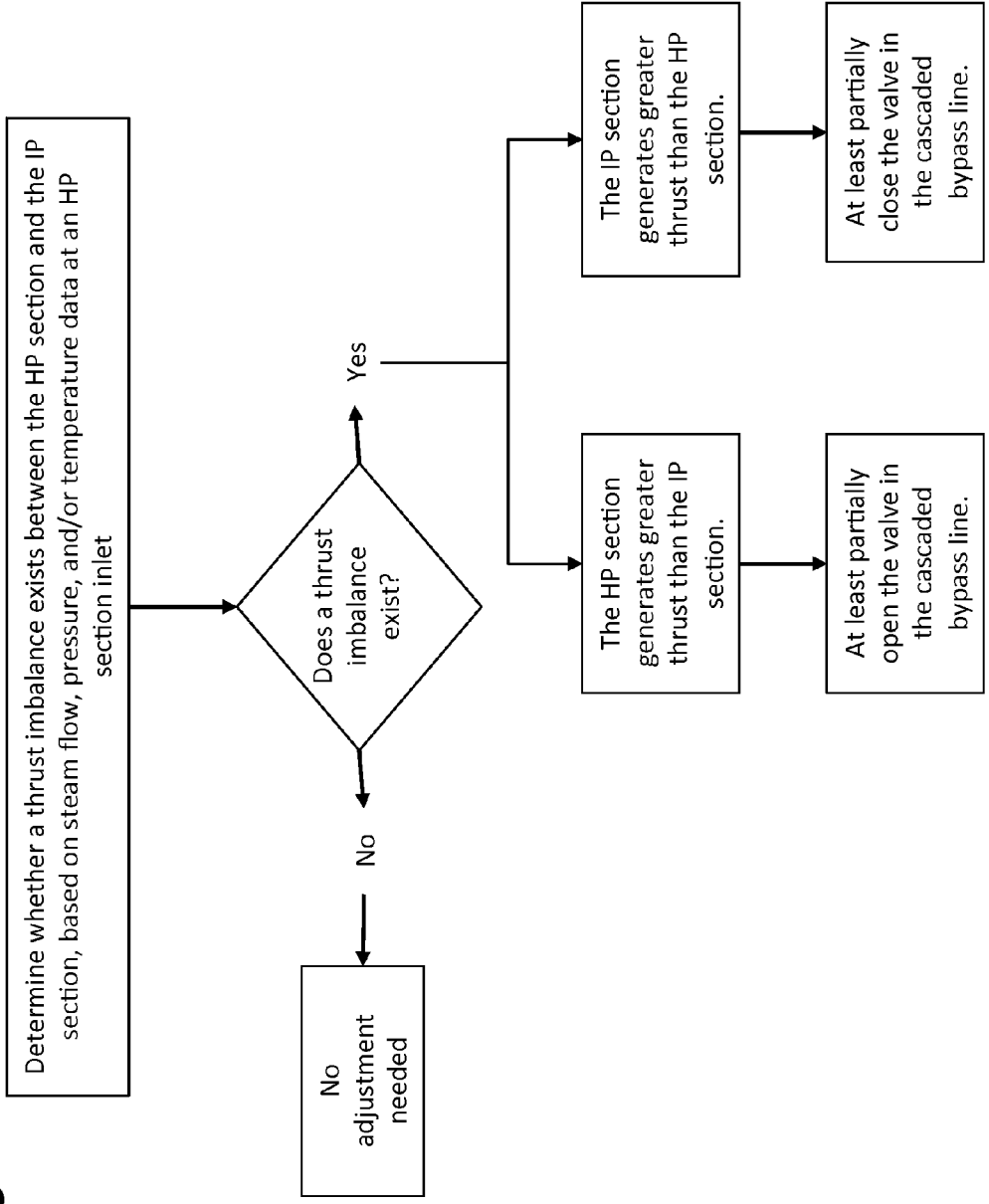
FIG. 3 shows a flow chart of a method according to an embodiment of the invention.

As shown in FIGS. 1-3, a method and a control system are provided for balancing thrust between a high pressure (HP) section and an intermediate pressure (IP) section of an opposed flow steam turbine in a combined cycle power plant. A combined cycle power plant including such a control system is also shown.

Turning first to FIG. 1, a combined cycle power plant 100 is shown. As noted above, in the embodiment depicted, combined cycle power plant 100 includes a gas turbine 110 and a steam turbine 200, although this is merely one possible combination. As shown in FIG. 1, using, e.g., natural gas or any of a number of types of gas as fuel, gas turbine 110 operates to generate hot gas, which does expansion work. Hot gas is then conducted from gas turbine expansion section 112 to heat recovery steam generator (HRSG) 114. There, the heat energy in the hot gas is used to generate steam for use in steam turbine 200. In various embodiments, gas turbine 110 may be operating at any predetermined load. In some embodiments, gas turbine 110 may operate at a load of less than Maximum Normal Load (Max-NL). Max-NL may vary by system, but may be as great as 100% in some embodiments. In some embodiments, the load may be greater than or equal to about Minimum Normal Load (Min-NL). Min-NL may vary by system, but may be as low as less than 50%, about 50%, or greater than 50% in various systems.

The steam generated in HRSG 114 may then be used to do work in steam turbine 200. In the embodiment shown in FIG. 1, steam turbine 200 includes high pressure (HP) section 210 and intermediate pressure (IP) section 220 arranged in an opposed flow relationship. Rotor 230 is axially disposed between HP section 210 and IP section 220. In some embodiments steam turbine 200 may further include low pressure (LP) section 240 downstream of IP section 220, with rotor 230 further being axially disposed between IP section 220 and LP section 240.

High pressure, high temperature steam may be conducted along high pressure steam line 116 from HRSG 114 to inlet 118 on HP section 210. Under typical steam turbine operation, steam would flow through the stages of HP section 210, performing work on stages of blades attached to rotor 230, and exit HP section 210 to be conducted back as reheat steam exhaust to HRSG 114 by HP exhaust line 120. In HRSG 114, the steam is reheated and conducted via intermediate pressure (IP) steam line 122 from HRSG 114 to inlet 124 of IP section 220. Under typical steam turbine operation, steam flows through the stages of IP section 220, expanding and performing work on stages of blades attached to rotor 230, and exits IP section 220 at a lower pressure than it entered at inlet 124. From there the low pressure steam may be conducted to LP section 240 to perform additional expansion work.

Combined cycle power plant 100 may further include a district heating (DH) system 300 powered by steam directly or indirectly from HRSG 114. Combined cycle power plant 100 may include a DH system line 126 for providing steam from HRSG 114 to DH system 300. A valved letdown line 128 may further be provided for variably providing a fraction of steam from IP steam line 122 to DH system line 126. Steam provided from IP steam line 122 to DH system line 126 via valved letdown line 128 augments the low pressure, low temperature steam provided from HRSG 114 to DH system 300, and reduces the volume of steam from HRSG 114 that reaches inlet 124 of IP section 220. As a result, the thrust on rotor 230 generated by IP section 220 is reduced.

A cascaded bypass line 130 including valve 132 may be provided, disposed between HP steam line 116 and HP exhaust line 120. Cascaded bypass line 130 provides a variable fraction of steam directly to HP exhaust line 120 from the HP steam line 116, bypassing HP section 210. Valve 132 in cascaded bypass line 130 may be controlled by control system 400 (FIG. 2), discussed further below.

Referring back to FIG. 1, the variable fraction of steam that bypasses HP section 210 via cascaded bypass line 130 may range anywhere from a 0% fraction, where valve 132 is closed, to a significant percentage of the steam in HP steam line 116, where valve 132 is wide open. In a given situation, opening valve 132 increases the amount of steam that bypasses HP section 210, and therefore decreases the amount of steam which enters HP section 210 at inlet 118 and performs mechanical work within HP section 210. This in turn decreases the thrust on rotor 230 that is generated by HP section 210. Thus, valve 132 can be opened or closed as needed to increase or decrease the thrust on rotor 230 generated by HP section 210 as necessary to offset the thrust generated by IP section 220 and balance the thrusts in opposed flow steam turbine 200. In the event that a fraction of steam provided from IP steam line 122 to DH system line 126 causes a thrust imbalance on rotor 230, valve 132 may be opened or closed in response to the imbalance to rectify it. As described above, in some embodiments, the thrust imbalance to be adjusted for may be at least partially caused by a fractional letdown of steam via letdown line 128 that diverts steam from IP section 220 to a district heating (DH) system 300.

Turning to FIG. 2, as noted above, the opening and closing of valve 132 may be controlled by control system 400, which may be linked to valve 132 via a communication link 402. Control system 400 may include a number of sensors located at inlet 118 of HP section 210, including one or more of a flow sensor 430, a pressure sensor 432, or a thermometer 434 disposed at inlet 118, and a computing device 404.

As shown, computing device 404 includes a processor 406, a memory 408, and input/output (I/O) interfaces 410 operably connected to one another. Further, computing device 404 is shown in communication with display 412, external I/O devices/resources 414, and storage unit 416. I/O devices 414 may include any type of user input device such as a mouse, keyboard, joystick, or other selection device. In general, processor 406 executes computer program code which provides the functions of control system 400. Such program code may be in the form of modules, including data receiving module 418, modeling module 420, thrust predicting/determining module 422, and signal transmission module 424, among other possible modules, and may be stored in memory 408 and/or storage unit 416, and perform the functions and/or steps of the present invention as described herein. Memory 408 and/or storage unit 416 can comprise any combination of various types of data storage media that reside at one or more physical locations. To this extent, storage unit 416 could include one or more storage devices, such as a magnetic disk drive or an optical disk drive. Still further, it is understood that one or more additional components not shown in FIG. 2 can be included in control system 400. Additionally, in some embodiments one or more external devices 414, display 412, and/or storage unit 416 could be contained within computing device 402, not externally as shown.

As noted, computing device 404 may include a plurality of modules. Separately or collectively, modules 418, 420, 422, 424 may include an algorithm for receiving data, applying the data to a model of steam turbine 200 and/or combined cycle power plant 100, predicting or determining the presence or absence of a thrust imbalance, and sending a signal to open or close valve 132 as needed to correct the imbalance, if one exists. In one embodiment, this logic may be embedded into each of the modules 418, 420, 422, 424. In another embodiment, this logic may reside in memory 408 on computing device 404, which receives data from a variety of sources including flow sensor 430, pressure sensor 432, or thermometer 434. In various embodiments, modules 418, 420, 422, 424 may be part of a standalone computing device 404, or may be integrated with any other plant control system which may be used. Further, other modules for analyzing other system parameters are also contemplated, and may also be included.

As shown in FIG. 2 and as referred to above, control system 400 may include a data receiving module 418 for receiving sensor data in the form of at least one of steam flow, pressure, or temperature data, as measured by one or more of flow sensor 430, pressure sensor 432, or thermometer 434. Flow sensor 430, pressure sensor 432, and thermometer 434 may transmit data to computing device 404 using any wired or wireless transmission protocol 436. Once received by computing device 404, the steam flow, pressure, and/or temperature data may be used, in some embodiments in connection with steam tables and other tables and references as known in the art, to calculate various properties of the steam such as specific volumes, enthalpies, and other properties.

Control system 400 may further include a modeling module 420 for entering the steam flow, pressure, and temperature data into a model of opposed flow steam turbine 200 and/or combined cycle power plant 100, and using the model and the steam flow, pressure, and temperature data, to predict or determine a thrust on rotor 230 in each of HP section 210 and IP section 220. The model may apply the various steam properties either directly measured or determined based on the direct measurements, to the particular areas, volumes, and other properties of steam turbine 200 to determine, for example, velocities at which the steam is flowing and other specifications, and ultimately the thrust generated by each of the HP section and the IP section.

Control system 400 may further include a thrust predicting/determining module 422 for predicting and/or determining a presence or an absence of a thrust imbalance between HP section 210 and IP section 220 based on the at least one of the steam flow, pressure, or temperature data. The presence or absence of a thrust imbalance between HP section 210 and IP section 220 may be predicted or determined based on the predicted or determined thrust, for example by modeling module 420, on rotor 230 in each of HP section 210 and IP section 220.

Control system 400 may further include a signal transmission module 424 for sending a signal to valve 132, e.g. via communication link 402, which may be any wired or wireless transmission protocol, causing valve 132 in cascaded bypass line 130 to open or close at least partially, thereby increasing or decreasing, respectively, the fraction of steam provided to HP exhaust line 120 from HP steam line 116, bypassing HP section 210, in the event of predicting or determining that a thrust imbalance is or will be present. Valve 132 may be at least partially opened, thereby increasing the fraction of steam provided to HP exhaust line 120 from HP steam line 116, bypassing HP section 210, where a thrust in HP section 210 is greater than an opposing thrust in IP section 220. Similarly, valve 132 may be at least partially closed, thereby decreasing the fraction of steam provided to HP exhaust line 120 from HP steam line 116, bypassing HP section 210, where a thrust in IP section 220 is greater than an opposing thrust in HP section 210. In this manner, control system 400 balances thrust between HP section 210 and IP section 220 in an opposed flow steam turbine 200.

As shown in FIG. 3, the disclosure further includes a method for balancing thrust in an opposed flow steam turbine having an HP section and an IP section, in a combined cycle power plant. Initially, a presence or absence of a thrust imbalance between the HP section and the IP section is predicted or determined based on steam flow, pressure, and/or temperature data at an HP section inlet. In various embodiments, the thrust imbalance may be at least partially caused by at least a fractional letdown of steam that diverts steam from the IP section to a district heating (DH) system.

If no thrust imbalance exists, no adjustment is necessary. If, however, a thrust imbalance exists, adjustment may be made. In particular, if a thrust imbalance exists in which the HP section generates greater thrust than the IP section, the valve in a valved cascaded bypass line may be opened at least partially, thereby increasing a fraction of steam that bypasses the HP section. This reduces the thrust generated by the HP section such that it can be balanced with the IP section. Alternatively, if a thrust imbalance exists in which the IP section generates greater thrust than the HP section, the valve in a valved cascaded bypass line may be closed at least partially, thereby decreasing a fraction of steam that bypasses the HP section. This increases the thrust generated by the HP section such that it can be balanced with the IP section.

As described herein, the technical effect of the combined cycle power plant, control system, and method provided herein is to provide a method and system for balancing thrust in an opposed flow steam turbine having an HP section and an IP section, in a combined cycle power plant having a heat application such as district heating. This facilitates maintaining thrust balance in the HP and IP steam turbine sections under various circumstances, including differing gas turbine loads, and various heat requirements from district heating applications. It also facilitates the use of existing power plants and steam turbines for district heating applications while avoiding excessive thrust imbalances.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A combined cycle power plant comprising:
   an opposed flow steam turbine having a high pressure (HP) section and an intermediate pressure (IP) section, and a rotor axially disposed between the HP section and the IP section;
   a heat recovery steam generator (HRSG);
   a high pressure (HP) steam line that conducts steam from the HRSG to an inlet on the HP section;
   an intermediate pressure (IP) steam line that conducts steam from the HRSG to an inlet of the IP section;
   a high pressure (HP) exhaust line that returns exhaust from the HP section to the HRSG;
   a district heating (DH) system line that provides steam from the HRSG to a DH system;
   a valved letdown line that provides a variable fraction of steam from the IP steam line to the DH system via the DH system line; and
   a valved cascaded bypass line including a valve, wherein the cascaded bypass line provides a variable fraction of steam to the HP exhaust line from the HP steam line, the variable fraction of steam thereby bypassing the HP section,
   wherein the variable fraction ranges from none of the steam in the HP line when the valve is closed to a fractional portion of the steam in the HP line when the valve is open, and
   wherein the valve is opened and the fractional portion of steam is provided in response to a condition in which the fraction of steam provided from the IP steam line to the DH system line causes a thrust imbalance on the rotor between the HP section and the IP section.

2. The combined cycle power plant of claim 1, further comprising a control system, the control system comprising:
   a computing device including a processor and a memory, the memory including instructions which when executed by the processor, cause the computing device to:
   receive at least one of steam flow, pressure, or temperature data measured at the inlet on the HP section; and
   predict or determine a presence or an absence of a thrust imbalance between the HP section and the IP section based on the at least one of the steam flow, pressure, or temperature data.

3. The combined cycle power plant of claim 2, wherein the computing device is further operable to:
   enter the at least one of the steam flow, pressure, and temperature data into a model of the opposed flow steam turbine; and
   using the model and the steam flow, pressure, and temperature data, determine a thrust or a predicted thrust on the rotor in each of the HP section and IP section,
   wherein the presence or absence of a thrust imbalance between the HP section and the IP section is determined based on the determined or predicted thrust on the rotor in each of the HP section and the IP section.

4. The combined cycle power plant of claim 2, wherein the computing device is further caused to:
   send a signal causing the valve in the cascaded bypass line to open at least partially, thereby increasing the fraction of steam provided to the HP exhaust line from the HP steam line, bypassing the HP section, in the event of predicting or determining that a thrust imbalance is present wherein a thrust in the HP section is greater than an opposing thrust in the IP section.

5. The combined cycle power plant of claim 2, wherein the computing device is further caused to:
   send a signal causing the valve in the cascaded bypass line to close at least partially, thereby decreasing the fraction of steam provided to the HP exhaust line from the HP steam line, bypassing the HP section, in the event of predicting or determining that a thrust imbalance is present wherein a thrust in the IP section is greater than an opposing thrust in the HP section.

6. The combined cycle power plant of claim 1, further comprising a gas turbine for providing hot gas, wherein the hot gas is conducted to the HRSG to generate steam.

7. The combined cycle power plant of claim 6, wherein the gas turbine operates at less than Max-NL load and at or greater than about Min-NL load.

8. A combined cycle power plant comprising:
   an opposed flow steam turbine having a high pressure (HP) section and an intermediate pressure (IP) section, and a rotor axially disposed between the HP section and the IP section;
   a heat recovery steam generator (HRSG);
   a high pressure (HP) steam line that conducts steam from the HRSG to an inlet on the HP section;
   an intermediate pressure (IP) steam line that conducts steam from the HRSG to an inlet of the IP section;
   a high pressure (HP) exhaust line that returns exhaust from the HP section to the HRSG;
   a district heating (DH) system line that provides steam from the HRSG to a DH system;
   a valved letdown line that provides a variable fraction of steam from the IP steam line to the DH system via the DH system line;
   a valved cascaded bypass line including a valve, wherein the cascaded bypass line provides a variable fraction of steam to the HP exhaust line from the HP steam line, the variable fraction of steam thereby bypassing the HP section, wherein the variable fraction ranges from none of the steam in the HP line when the valve is closed to a fractional portion of the steam in the HP line when the valve is open, and wherein the valve is opened and the fractional portion of steam is provided in response to a condition in which the fraction of steam provided from the IP steam line to the DH system line causes a thrust imbalance on the rotor between the HP section and the IP section; and
   a control system, the control system comprising:
   a computing device including a processor and a memory, the memory including instructions which when executed by the processor, cause the computing device to:
   receive at least one of steam flow, pressure, or temperature data measured at the inlet on the HP section;
   predict or determine a presence or an absence of a thrust imbalance between the HP section and the IP section based on the at least one of the steam flow, pressure, or temperature data;
   enter the at least one of the steam flow, pressure, and temperature data into a model of the opposed flow steam turbine; and using the model and the steam flow, pressure, and temperature data, determine a thrust or a predicted thrust on the rotor in each of the HP section and IP section, wherein the presence or absence of a thrust imbalance between the HP section and the IP section is determined based on the determined or predicted thrust on the rotor in each of the HP section and the IP section.

9. The combined cycle power plant of claim 8, further comprising a gas turbine for providing hot gas, wherein the hot gas is conducted to the HRSG to generate steam.

10. The combined cycle power plant of claim 9, wherein the gas turbine operates at less than Max-NL load and at or greater than about Min-NL load.

11. A combined cycle power plant comprising:
an opposed flow steam turbine having a high pressure (HP) section and an intermediate pressure (IP) section, and a rotor axially disposed between the HP section and the IP section;
a heat recovery steam generator (HRSG);
a gas turbine for providing hot gas, wherein the hot gas is conducted to the HRSG to generate steam, and wherein the gas turbine operates at less than Max-NL load and at or greater than about Min-NL load;
a high pressure (HP) steam line that conducts steam from the HRSG to an inlet on the HP section;
an intermediate pressure (IP) steam line that conducts steam from the HRSG to an inlet of the IP section;
a high pressure (HP) exhaust line that returns exhaust from the HP section to the HRSG;
a district heating (DH) system line that provides steam from the HRSG to a DH system;
a valved letdown line that provides a variable fraction of steam from the IP steam line to the DH system via the DH system line; and
a valved cascaded bypass line including a valve, wherein the cascaded bypass line provides a variable fraction of steam to the HP exhaust line from the HP steam line, the variable fraction of steam thereby bypassing the HP section,
wherein the variable fraction ranges from none of the steam in the HP line when the valve is closed to a fractional portion of the steam in the HP line when the valve is open, and
wherein the valve is opened and the fractional portion of steam is provided in response to a condition in which the fraction of steam provided from the IP steam line to the DH system line causes a thrust imbalance on the rotor between the HP section and the IP section.

12. The combined cycle power plant of claim 11, further comprising a control system, the control system comprising:
a computing device including a processor and a memory, the memory including instructions which when executed by the processor, cause the computing device to:
receive at least one of steam flow, pressure, or temperature data measured at the inlet on the HP section; and
predict or determine a presence or an absence of a thrust imbalance between the HP section and the IP section based on the at least one of the steam flow, pressure, or temperature data.

13. The combined cycle power plant of claim 12, wherein the computing device is further operable to:
enter the at least one of the steam flow, pressure, and temperature data into a model of the opposed flow steam turbine; and
using the model and the steam flow, pressure, and temperature data, determine a thrust or a predicted thrust on the rotor in each of the HP section and IP section,
wherein the presence or absence of a thrust imbalance between the HP section and the IP section is determined based on the determined or predicted thrust on the rotor in each of the HP section and the IP section.

14. The combined cycle power plant of claim 12, wherein the computing device is further caused to:
send a signal causing the valve in the cascaded bypass line to open at least partially, thereby increasing the fraction of steam provided to the HP exhaust line from the HP steam line, bypassing the HP section, in the event of predicting or determining that a thrust imbalance is present wherein a thrust in the HP section is greater than an opposing thrust in the IP section.

15. The combined cycle power plant of claim 12, wherein the computing device is further caused to:
send a signal causing the valve in the cascaded bypass line to close at least partially, thereby decreasing the fraction of steam provided to the HP exhaust line from the HP steam line, bypassing the HP section, in the event of predicting or determining that a thrust imbalance is present wherein a thrust in the IP section is greater than an opposing thrust in the HP section.

* * * * *